US007030895B2

(12) United States Patent
Aoki et al.

(10) Patent No.: US 7,030,895 B2
(45) Date of Patent: Apr. 18, 2006

(54) IMAGE FORMING APPARATUS

(75) Inventors: Shinji Aoki, Sunto-gun (JP); Masashi Takahashi, Yokohama (JP); Masashi Hiroki, Yokohama (JP); Takeshi Watanabe, Ichikawa (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 9 days.

(21) Appl. No.: 10/385,716

(22) Filed: Mar. 12, 2003

(65) Prior Publication Data

US 2004/0179082 A1 Sep. 16, 2004

(51) Int. Cl.
*B41J 2/395* (2006.01)
*G01D 15/06* (2006.01)
*G03G 15/01* (2006.01)

(52) U.S. Cl. .................................... 347/115; 347/253

(58) Field of Classification Search ................ 347/118, 347/115, 140, 253; 399/177, 179, 51, 149, 399/257, 49, 66
See application file for complete search history.

(56) References Cited

U.S. PATENT DOCUMENTS 6,240,269 B1 * 5/2001 Kaya et al. ................. 399/128
6,564,021 B1 * 5/2003 Nakai et al. .................. 399/49

FOREIGN PATENT DOCUMENTS

| | | |
|---|---|---|
| JP | 5-341643 A | 12/1993 |
| JP | 8-146696 A | 6/1996 |
| JP | 11-24354 A | 1/1999 |

* cited by examiner

*Primary Examiner*—Andrew H. Hirshfeld
*Assistant Examiner*—Leo T. Hinze
(74) *Attorney, Agent, or Firm*—Foley & Lardner LLP

(57) ABSTRACT

There is provided a photoreceptor cleanerless image forming apparatus capable of decreasing color mixture or an exposure error due to reverse transfer toner or untransferred toner.

An image forming apparatus 100 according to the present invention comprises four image forming units 100*a*, 100*b*, 100*c*, and 100*d* configured to be photoreceptor cleanerless in a 4-drum tandem manner. Each image forming unit includes a photoreceptor 103*a*, 103*b*, 103*c*, or 103*d*, a charger 105*a*, 105*b*, 105*c*, or 105*d*, an exposure apparatus 106*a*, 106*b*, 106*c*, or 106*d*, and a developing apparatus 109*a*, 109*b*, 109*c*, or 109*d*. When exposure intensities Iy, Ic, Im, and Ik are assumed for exposure sources of the exposure apparatuses in the image forming units which form yellow, magenta, cyan, and black images, respectively, the exposure intensities are configured to satisfy conditions of $Ik \geqq Ic \geqq Im \geqq Iy$ and $Ik > Iy$. This decreases an exposure error (image hysteresis) in an image formed on paper.

40 Claims, 4 Drawing Sheets

IMAGE FORMING APPARATUS

BACKGROUND OF THE INVENTION

1. Field of the Invention

The present invention relates to an image forming apparatus and more particularly to a photoreceptor cleanerless image forming apparatus which overlappingly forms yellow, magenta, cyan, and black toner images and continuously prints color images.

2. Description of the Related Art

The technology indicative of this type of image forming apparatus is disclosed in Jpn. Pat. Appln. Laid-Open Publication No. 5-341643, for example. While this example shows the photoreceptor cleanerless image forming apparatus handling a single color, it is developed to a 4-drum tandem image forming apparatus for continuously printing color images. FIG. 5 is a schematic diagram exemplifying a 4-drum tandem image forming apparatus according to the conventional photoreceptor cleanerless system. An image forming apparatus 400 is used for electrophotographic copiers and printers. There are arranged four photoreceptor cleanerless image forming units 400*a*, 400*b*, 400*c*, and 400*d* in tandem (4-drum tandem system). The image forming units 400*a*, 400*b*, 400*c*, and 400*d* having the same configuration form and transfer yellow, magenta, cyan, and black images.

The image forming unit 400*a* comprises a photoreceptor drum 403*a*, a charger 405*a* (e.g., scorotron charger), an exposure apparatus 406*a*, a developing apparatus 409*a* (e.g., 2-component developing apparatus), a transfer roller 423*a*, a DC power supply 427*a*, a destaticizer 421*a*, and a brush roller 422*a*. The other image forming units 400*b*, 400*c*, and 400*d* comprise the same constituent parts. An aligning roller 414 feeds paper P at a specified timing. The paper P is transported on an endless transport belt 111 between the photoreceptor drum (also abbreviated to the photoreceptor) and the transfer roller. The transport belt 111 is hung between a driving roller 428 and a driven roller 429. When the paper passes through between the photoreceptor drum and the transfer roller, a toner image is transferred to the paper P from the photoreceptor drum due to a transfer electric field between the photoreceptor drum and the transfer roller. After each color has been transferred, the toner image formed on the paper is fixed by a fixing apparatus (not shown) arranged downstream.

No photoreceptor cleaner is provided when each image forming unit is configured according to the photoreceptor cleanerless system as mentioned above. The toner is not completely transferred to the paper P and partially remains as untransferred toner on the photoreceptor drum. After passing through the destaticizer, the untransferred toner is charged together with the photoreceptor surface by the charger (e.g., scorotron charger) and then is exposed. After passing through the charger, however, an electric potential of the untransferred toner is higher than a developing bias of the 2-component developing apparatus. When the development is performed, the untransferred toner is also collected to the developing apparatus. The photoreceptor cleanerless system is characterized in that the untransferred toner is collected if no cleaner is provided. It should be noted that a brush or a brush roller may be provided immediately before the charger.

During the transfer process as mentioned above, the toner on the photoreceptor is transferred to a transfer material (paper or intermediate transferrer) due to the transfer electric field. If the transfer electric field is large, the toner once transferred to the transfer material is again returned to the photoreceptor (reverse transfer phenomenon). The inventors consider the reverse transfer phenomenon as follows. The reverse transfer phenomenon frequently occurs when there is a large difference between the charged potential on the rear (normally equivalent to a ground potential) or surface of the photoreceptor and an actual value of the transfer bias. After the transfer material passes through a transfer nip, the charged amount for the toner on the transfer material increases compared to that for the toner on the transfer material before passing through transfer nip. On the other hand, the charged amount for the reverse transfer toner greatly decreases (positively charged). It is assumed that a Paschen discharge occurring near the transfer nip causes the reverse transfer phenomenon. It is important to solve how to suppress the reverse transfer that causes the transfer efficiency to decrease, toner particles to scatter, and the image quality to degrade. Since the photoreceptor cleanerless system particularly allows the developing apparatus to collect untransferred toner remaining on the photoreceptor, this system can decrease waste toner and prolong the photoreceptor life. However, there remains a problem of mixing toner colors in the developing apparatus if a plurality of colors of toner simultaneously causes the reverse transfer phenomenon.

It is possible to decrease the reverse transfer phenomenon by setting a low transfer bias when transferring the toner to the transfer material from the photoreceptor. However, setting a low transfer bias prevents the toner on the photoreceptor from being completely transferred to the transfer material, increasing the amount of untransferred toner. In the image forming apparatus based on the photoreceptor cleanerless system, untransferred toner or reverse transfer toner is not cleaned until passing through the development nip. For this reason, the untransferred toner or the reverse transfer toner is charged by the charger together with the photoreceptor surface during continuous printing, and then is exposed by an exposure source during a latent image formation process. Accordingly, these toners cause charged spots on the photoreceptor surface or an incorrect latent image formation. The incorrect latent image formation due to an exposure error is especially remarkable. There is a problem that a toner image reveals a decreased density or density spots in a solid image or a halftone image as an image hysteresis.

SUMMARY OF THE INVENTION

The present invention has been made in order to solve the above-mentioned problems. It is therefore an object of the present invention to provide a photoreceptor cleanerless image forming apparatus capable of minimizing color mixture or an exposure error due to reverse transfer toner or untransferred toner.

In order to solve the above-mentioned problems, the present invention provides a photoreceptor cleanerless image forming apparatus to overlappingly form yellow, magenta, cyan, and black toner images, wherein the apparatus is conditioned to decrease color mixture or exposure error with respect to at least one of an exposure intensity, an exposure resolution, a volume-based average particle diameter of toner, a light source wavelength, a layer thickness of toner to be transferred, and the weight-based average charged amount of toner. According to this configuration, it is possible to minimize color mixture and an exposure error without largely modifying the mechanical structure of a conventional image forming apparatus.

Further, the present invention provides a 4-drum tandem image forming apparatus comprising four photoreceptor cleanerless image forming units each including at least a photoreceptor, a charger, an exposure apparatus, and a developing apparatus for overlappingly forming yellow, magenta, cyan, and black images, wherein exposure intensities Iy, Ic, Im, and Ik are configured to satisfy conditions of Ik≧Ic≧Im≧Iy and Ik>Iy, where the exposure intensities Iy, Ic, Im, and Ik correspond to exposure sources for exposure apparatuses in image forming units to form yellow, magenta, cyan, and black images, respectively. This order of exposure intensities corresponds to the order of intensities at which pigments used for the respective colors of toners absorb light from a light source (e.g., laser). Irradiation intensities of the light source are configured to this order to decrease the image hysteresis.

In the above-mentioned invention, the image forming unit is provided with a transfer condition so adjusted that the sum of layer thicknesses for untransferred toner and reverse transfer toner becomes 100 [g/cm$^2$] or less during transfer of a solid image. This is because an exposure error becomes conspicuous if the layer thicknesses of the untransferred toner and the reverse transfer toner exceeds 100 [g/cm$^2$]. It is preferable that the exposure source complies with a red or near-infrared area whose center wavelength is 630 nm or more, and is configured to be a semiconductor laser. This type of exposure source provides a stable function, is easily available, and is suited for miniaturization.

The present invention provides a 4-drum tandem image forming apparatus comprising four photoreceptor cleanerless image forming units each including at least a photoreceptor, a charger, an exposure apparatus, and a developing apparatus for overlappingly forming yellow, magenta, cyan, and black images, wherein exposure resolutions Ry, Rm, Rc, and Rk are configured to satisfy conditions of Rk≦Rc≦Rm and Rm>Rk, where the exposure resolutions Ry, Rm, Rc, and Rk correspond to exposure apparatuses in image forming units to form yellow, magenta, cyan, and black images, respectively. In this case, it is possible to reduce an exposure error by making the exposure resolution for black lower than exposure resolutions for the other colors during formation of an electrostatic latent image. Further, exposure resolutions Ry and Rk may be the same.

When the exposure resolutions are set as mentioned above, the image forming unit is preferably provided with a transfer condition so adjusted that the sum of layer thicknesses for untransferred toner and reverse transfer toner becomes 100 [g/cm2] or less during transfer of a solid image. Preferably, the exposure source complies with a red or near-infrared area whose center wavelength is 630 nm or more, and is configured to be a semiconductor laser. Moreover, it is preferable that beam diameters Dy, Dm, Dc, and Dk are configured to satisfy conditions of Dk≧Dc≧Dm≧Dk and Dk>Dy, where the beam diameters Dy, Dm, Dc, and Dk are used for the exposure source to create an electrostatic latent image.

According to the present invention, the image forming apparatus is a 4-drum tandem image forming apparatus comprising four photoreceptor cleanerless image forming units each including at least a photoreceptor, a charger, an exposure apparatus, and a developing apparatus for overlappingly forming yellow, magenta, cyan, and black images, wherein exposure resolutions Ry, Rm, Rc, and Rk are configured to satisfy conditions of Rk≦Rc≦Rm≦Ry and Ry>Rk, where the exposure resolutions Ry, Rm, Rc, and Rk correspond to image forming units to form yellow, magenta, cyan, and black images, respectively. Also in this case, it is possible to reduce an exposure error by making the exposure resolution for black lower than exposure resolutions for the other colors during formation of an electrostatic latent image.

According to the present invention, the image forming apparatus comprises four photoreceptor cleanerless developing apparatuses to overlappingly form yellow, magenta, cyan, and black toner images, wherein volume-based average particle diameters Pa, Pb, Pc, and Pd are configured to satisfy conditions of Pa≧Pb≧Pc≧Pd and Pa>Pd, where Pa, Pb, Pc, and Pd indicate volume-based average particle diameters of toners to be developed on a photoreceptor in the order of development. Generally, the toner having a small particle diameter does not cause an exposure error. The black toner especially causes a large exposure error. It is possible to reduce an exposure error by making the diameter of black toner particles smaller than diameters of the other toner particles.

When the volume-based average particle diameter is configured so as not to cause an exposure error as mentioned above, the image forming apparatus is preferably configured in 4-drum tandem so that four photoreceptor cleanerless image forming units can overlappingly form yellow, magenta, cyan, and black images on a transfer material. Alternatively, the image forming apparatus is preferably configured in accordance with a 4-rotation system so that four photoreceptor cleanerless developing apparatuses can overlappingly form yellow, magenta, cyan, and black images on an intermediate transferrer, and then these images are transferred onto a transfer material from the intermediate transferrer at a time. In these cases, a transfer condition is preferably so adjusted that the sum of layer thicknesses for untransferred toner and reverse transfer toner becomes 100 [g/cm$^2$] or less during transfer of a solid image. It is preferable that the exposure source performs exposure within a red or near-infrared area whose center wavelength is 630 nm or more, and is configured to be a semiconductor laser. Further, it is preferable that the weight-based average charged amounts of yellow, magenta, cyan, and black toners are configured to produce an initial difference within the range of ±5 [C/g].

The present invention is a photoreceptor cleanerless image forming apparatus to overlappingly form yellow, magenta, cyan, and black toner images, wherein an exposure source used for forming an electrostatic latent image complies with a blue or blue-violet area whose center wavelength is 460 nm or less. If the exposure source uses red light, the cyan toner absorbs the red light and easily causes an exposure error. Accordingly, the exposure source uses blue light or any other light belonging to a blue-violet area. The yellow toner absorbs blue light and causes an exposure error more easily than the case of using the red light. However, the image hysteresis of the yellow toner is hardly recognizable to human eyes, causing little problems.

When the exposure source to be used complies with a blue or blue-violet area whose center wavelength is 460 nm or less as mentioned above, the image forming apparatus is preferably provided with a transfer condition so adjusted that the sum of layer thicknesses for untransferred toner and reverse transfer toner becomes 100 [g/cm$^2$] or less during transfer of a solid image. The image forming apparatus is preferably configured in 4-drum tandem so that four photoreceptor cleanerless image forming units can overlappingly form yellow, magenta, cyan, and black images on a transfer material. Alternatively, the image forming apparatus is preferably configured in accordance with a 4-rotation system so that four photoreceptor cleanerless image forming units can overlappingly form yellow, magenta, cyan, and black images on an intermediate transferrer, and then these images are transferred onto a transfer material from the intermediate transferrer at a time.

The present invention is a 4-drum tandem image forming apparatus comprising four photoreceptor cleanerless image forming units each including at least a photoreceptor, a charger, an exposure apparatus, and a developing apparatus for overlappingly forming yellow, magenta, cyan, and black images, wherein an exposure source for forming a yellow electrostatic latent image complies with a red or near-infrared area whose center wavelength is 630 nm or more, and an exposure source used for forming at least a cyan electrostatic latent image out of the other electrostatic latent images in the remaining colors complies with a blue or blue-violet area whose center wavelength is 460 nm or less. In this case, the red light is used as an exposure source to form a yellow electrostatic latent image because the red light causes small exposure errors while the blue light causes large exposure errors. On the other hand, the blue light is used as an exposure source to form a cyan electrostatic latent image because the blue light causes smaller exposure errors than those caused by the exposure source of the same color.

When the red light and the blue light are combined to be used as light sources, the image forming unit is preferably provided with a transfer condition so adjusted that the sum of layer thicknesses for untransferred toner and reverse transfer toner becomes 100 $[g/cm^2]$ or less during transfer of a solid image. It is preferable that the exposure source is a semiconductor laser. Further, it is preferable that exposure sources for forming magenta and black electrostatic latent images comply with a red or near-infrared area whose center wavelength is 630 nm or more. Moreover, it is preferable that exposure sources for forming magenta and black electrostatic latent images comply with a blue or blue-violet area whose center wavelength is 460 nm or less.

The present invention is a photoreceptor cleanerless image forming apparatus to overlappingly form yellow, magenta, cyan, and black toner images, wherein layer thicknesses Ta, Tb, Tc, and Td are configured to satisfy conditions of $Ta \leqq Tb \leqq Tc \leqq Td$ and $Ta<Td$, where Ta, Tb, Tc, and Td indicate thicknesses of toner layers to be transferred to a transfer material in this order. An effect of the reverse transfer becomes more remarkable toward downstream along the direction of moving the transfer material. As a result, the degree of color mixture becomes higher. Accordingly, it is possible to suppress the ratio of color mixture in developing apparatuses and improve the color reproducibility by thickening the toner layer (increasing the development amount) for downstream developing apparatuses.

When toners are transferred to a transfer material by thickening the toner layers in the order of transfers, the above-mentioned four toner images are formed in the order of yellow, magenta, cyan, and black from upstream to downstream. It is preferable that a ratio between X and Y is greater than or equal to 1/25000 and is smaller than or equal to 1/10, where X indicates a layer thickness of a toner image developed on a photoreceptor during solid image formation, and Y indicates a layer thickness of toner returned to a photoreceptor from a solid toner image already transferred to a transfer material. Further, the image forming apparatus is preferably configured in 4-drum tandem so that four photoreceptor cleanerless image forming units can overlappingly form yellow, magenta, cyan, and black images on a transfer material. Moreover, the image forming apparatus is preferably configured in accordance with a 4-rotation system so that four photoreceptor cleanerless image forming units can overlappingly form yellow, magenta, cyan, and black images on an intermediate transferrer, and then these images are transferred onto a transfer material from the intermediate transferrer at a time.

Furthermore, the present invention is a photoreceptor cleanerless image forming apparatus to overlappingly form yellow, magenta, cyan, and black toner images, wherein weight-based average charged amounts Qa, Qb, Qc, and Qd are configured to satisfy conditions of $Qa \leqq Qb \leqq Qc \leqq Qd$ and $Qa<Qd$, where Qa, Qb, Qc, and Qd indicate weight-based average charged amounts of toners to be transferred to a transfer material in this order. In this case, the development is made easier by decreasing the charged amount of toner to be transferred. This amount of the toner is set to be as small as the charge amount of toner previously used for the development. If a reverse transfer phenomenon occurs, it is possible to selectively exhaust reverse transfer toners out of the developing apparatus into which the reverse transfer toners mixed due to the reverse transfer phenomenon, thus reducing color mixture.

When toners are transferred to a transfer material by increasing the weight-based average charged amount of the toners in the order of transfers, volume-based average particle diameters of toners in the respective colors are configured to produce an initial difference within the range of ±1 [m]. It is preferable that volume-based average particle diameters Pa, Pb, Pc, and Pd are configured to satisfy conditions of $Pa \geqq Pb \geqq Pc \geqq Pd$ and $Pa>Pd$, where Pa, Pb, Pc, and Pd indicate volume-based average particle diameters of toners to be developed on a photoreceptor in this order. Still further, it is preferable that layer thicknesses Ta, Tb, Tc, and Td are configured to satisfy conditions of $Ta \leqq Tb \leqq Tc \leqq Td$ and $Ta<Td$, where Ta, Tb, Tc, and Td indicate layer thicknesses of toners to be developed on a photoreceptor in this order.

DESCRIPTION OF THE PREFERRED EMBODIMENTS

Figure 1:
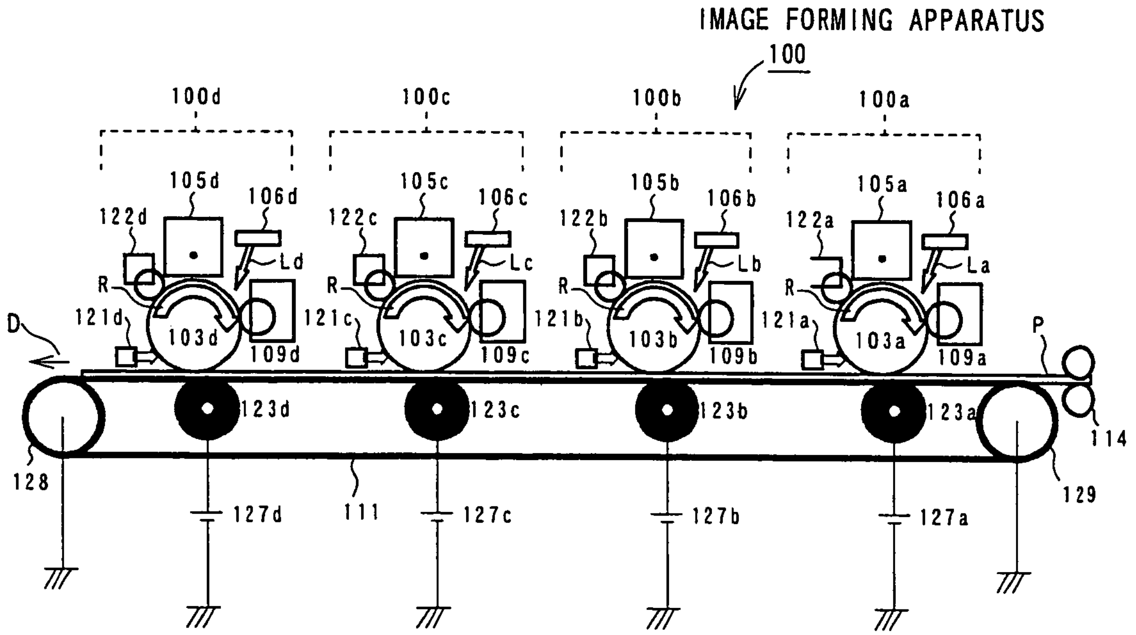
FIG. 1 is a schematic diagram showing a 4-drum tandem image forming apparatus employing the photoreceptor cleanerless system as an embodiment of an image forming apparatus according to the present invention.
Figure 2:
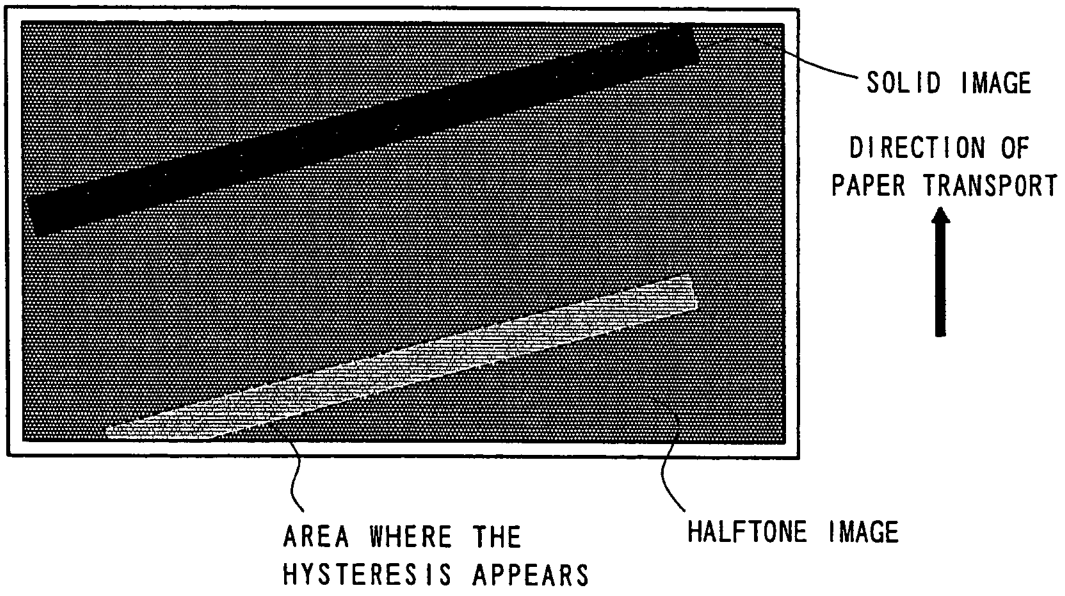
FIG. 2 shows an example used for image quality evaluation when the image forming apparatus in FIG. 1 prints a halftone image at an area print ratio of 50%.
Figure 3:
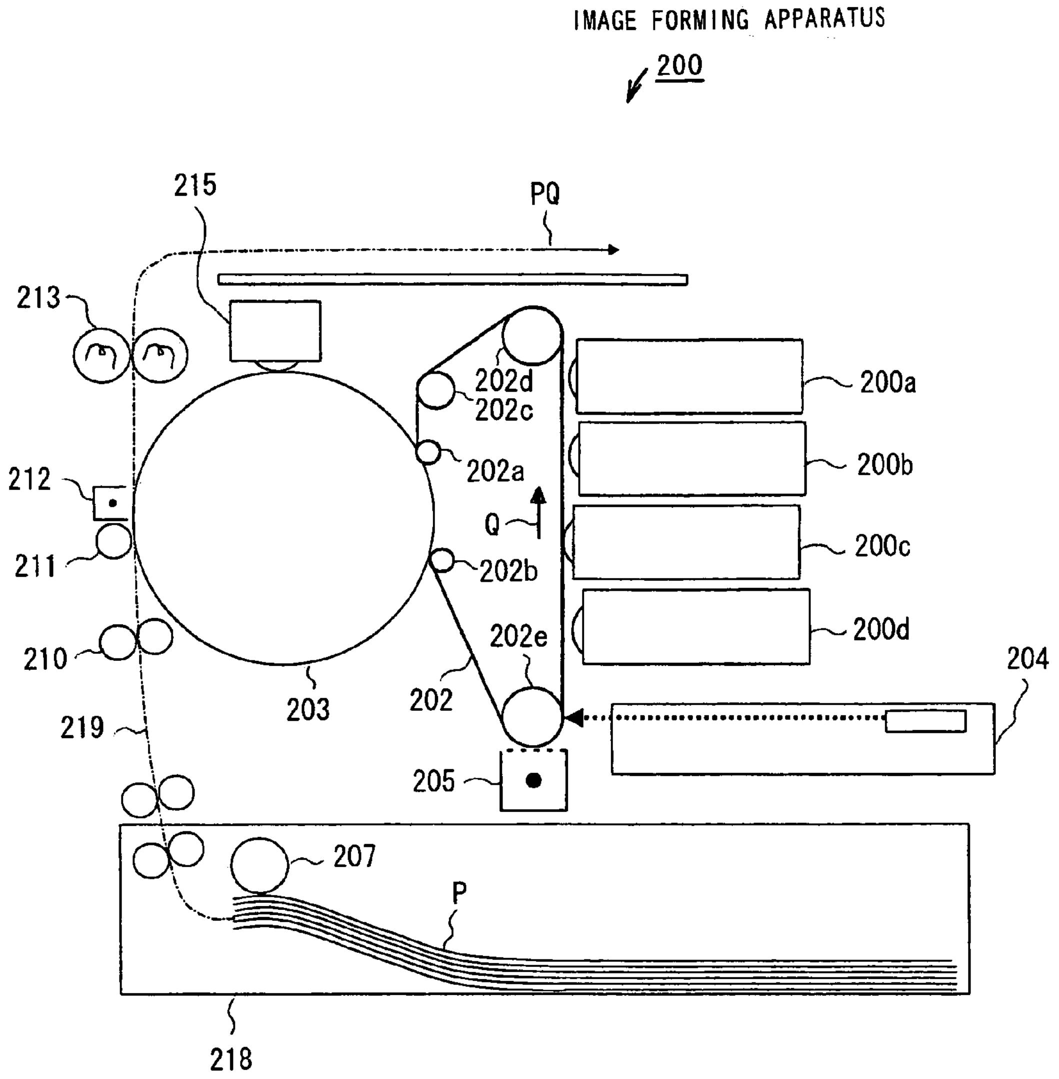
FIG. 3 is a schematic diagram showing another embodiment of image forming apparatus according to the present invention, namely a photoreceptor cleanerless image forming apparatus based on a 4-rotation image forming system.
Figure 4:
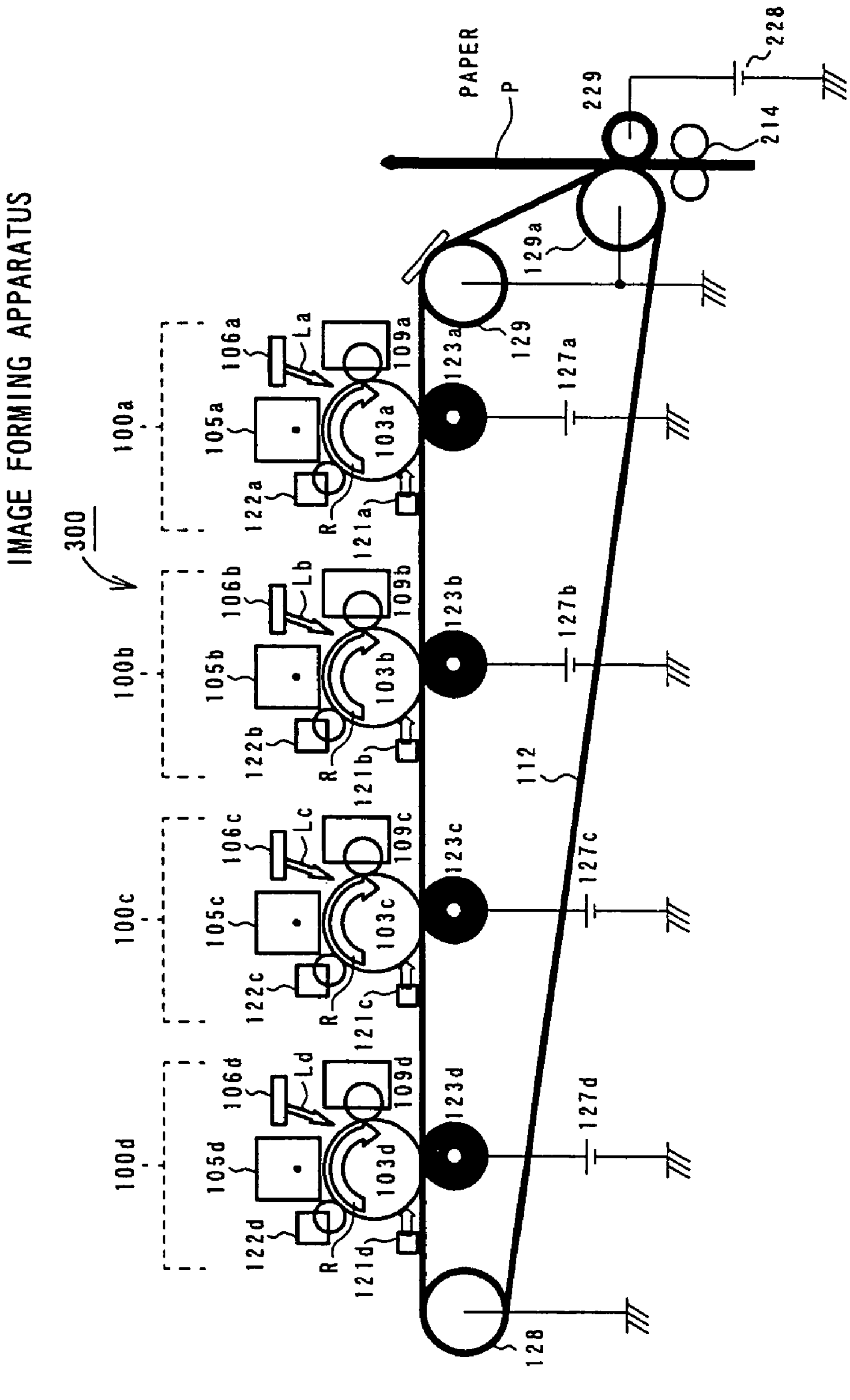
FIG. 4 is a schematic diagram showing yet another embodiment of image forming apparatus according to the present invention, namely an image forming apparatus modified by replacing a transport belt of the image forming apparatus in FIG. 1 with an intermediate transfer belt.
Figure 5:
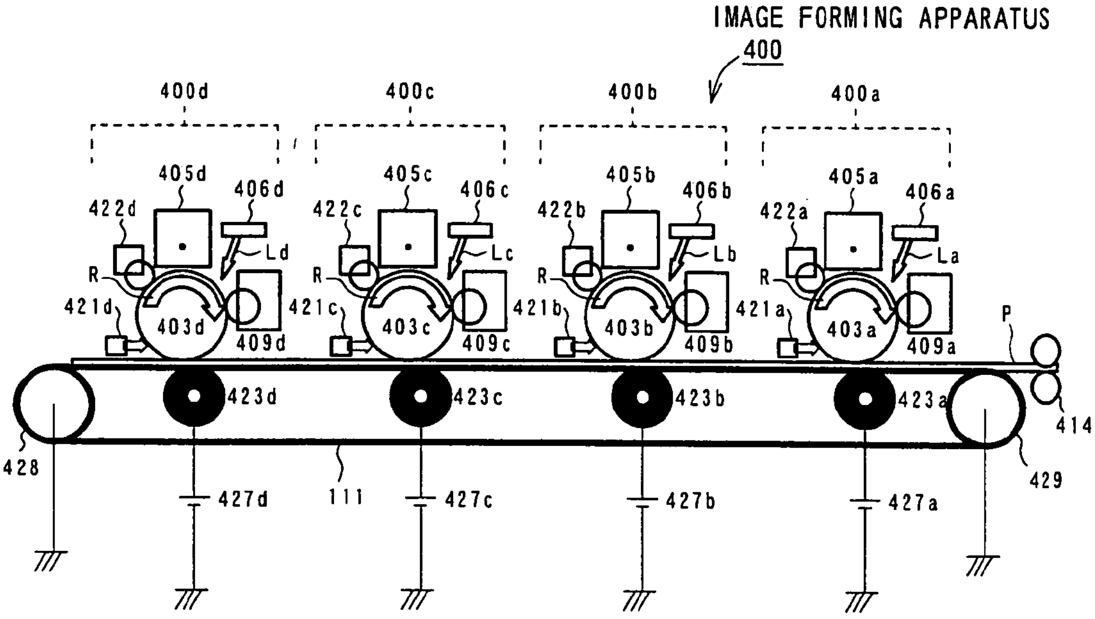
FIG. 5 is a schematic diagram showing a conventional example of the photoreceptor cleanerless 4-drum tandem image forming apparatus.

Embodiments of the present invention will be described in further detail with reference to the accompanying drawings. FIG. 1 is a schematic diagram showing a 4-drum tandem image forming apparatus employing the photoreceptor cleanerless system as an embodiment of an image forming apparatus according to the present invention. FIG. 2 shows an example used for image quality evaluation when the image forming apparatus in FIG. 1 prints a halftone image at an area print ratio of 50%. FIG. 3 is a schematic diagram showing another embodiment of image forming apparatus according to the present invention, namely a photoreceptor cleanerless image forming apparatus based on a 4-rotation image forming system. FIG. 4 is a schematic diagram showing an image forming apparatus modified by replacing a transport belt of the image forming apparatus in FIG. 1 with an intermediate transfer belt.

An image forming apparatus 100 in FIG. 1 is used for electrophotographic copiers and printers. There are arranged four image forming units 100*a*, 100*b*, 100*c*, and 100*d* in tandem (4-drum tandem system) for continuous color printing. These image forming units 100*a*, 100*b*, 100*c*, and 100*d* are configured in accordance with a so-called photoreceptor cleanerless system. The image forming units each form and transfer yellow, magenta, cyan, and black images. Each image forming unit performs almost the same image forming and transferring operations except for difference of colors in a formed image. Except for necessary cases, the following only describes the image forming unit 100*a* representative of the image forming units 100*a*, 100*b*, 100*c*, and 100*d*. The same reference numerals are designated to mutually corresponding members for the image forming unit 100*a* and any of the other image forming units 100*b*, 100*c*, and 100*d* so that the other image forming units 100*b*, 100*c*, and 100*d* can be easily understood on the basis of the description of the image forming unit 100*a*. The reference numerals are assigned with alphabetical letters b, c, and d indicative of the image forming units 100*b*, 100*c*, and 100*d*.

The image forming unit 100*a* comprises a photoreceptor drum 103*a*, a charger 105*a*, an exposure apparatus 106*a*, a developing apparatus 109*a*, a transfer roller 123*a*, a DC power supply 127*a*, a destaticizer 121*a*, and a brush roller 122*a*. The transport belt 111 mounts paper P supplied from an aligning roller 114 at a specified timing and transports the paper P in the direction of arrow D between the photoreceptor drums (abbreviated to photoreceptors depending on cases) 103*a*, 103*b*, 103*c*, and 103*d* and the transfer rollers 123*a*, 123*b*, 123*c*, and 123*d*, respectively. The transport belt 111 is an endless belt, is hung between a driving roller 128 and a driven roller 129, and is rotated. The photoreceptor drum 103 is made of an OPC (Organic Photoconductor) and is installed so as to rotate in the direction of arrow R.

The charger 105*a* is, for example, a scorotron charger and is arranged along the photoreceptor drum 103*a*. The charger 105*a* evenly charges the surface of the photoreceptor drum 103*a* to a negative potential (e.g., −600 V). The exposure apparatus 106*a* is arranged downstream (in the direction of arrow R) from the charger 105*a*. The exposure apparatus 106*a* irradiates light La from an exposure source based on image information. The irradiated light La is projected on the surface of the photoreceptor drum 103*a* to form an electrostatic latent image (e.g., −100V) on the surface of the photoreceptor drum 103*a*.

The developing apparatus 109*a* is arranged downstream from the exposure apparatus 106*a*. The developing apparatus 109*a* uses, for example, 2-component developer (e.g., charged to −400 V) containing the reserved yellow toner to form an image comprising the yellow toner (toner image) on the surface of the photoreceptor drum 103*a* (reverse development) based on the electrostatic latent image on the surface of the photoreceptor drum 103*a*. In this case, the developing apparatus 109*a* has a function (cleaning function) of collecting toner that is not used for the development function. More specifically, the developing apparatus 109*a* has the function of collecting toner remaining on the surface of the photoreceptor drum 103*a* and reusing the collected toner for development. This function is based on the effect of a difference between the potential (e.g., −600 V) for the toner remaining on part of the surface of the photoreceptor drum 103*a* with no electrostatic latent image formed and the potential (e.g., −400 V) for the developer of the developing apparatus 109*a*. (In this manner, the photoreceptor cleanerless system is characterized by enabling the cleaning if no cleaner is provided.)

The transfer roller 123*a*is positioned downstream from the developing apparatus 109*a* and below the photoreceptor drum 103*a* in FIG. 1. Together with the photoreceptor drum 103*a*, the transfer roller 123*a* holds the transport belt 111 therebetween. The transfer roller 123*a* is arranged opposite the photoreceptor drum 103*a* and constitutes a transfer section in cooperation with the photoreceptor drum 103*a*. The transfer roller 123*a* is applied with DC voltage (e.g., +1000 V) from the power supply 127*a*. A transfer electric field exists between the photoreceptor drum 103*a* and the transfer roller 123*a* because they are charged to polarities reverse to each other. When the transport belt 111 feeds the paper P to the transfer section between the photoreceptor drum 103*a* and the transfer roller 123*a*, a toner image on the photoreceptor drum 103*a* is transferred onto the paper P.

It will be ideal if the toner image on the photoreceptor drum 103*a* is completely transferred to the paper P as mentioned above. However, part of the toner is inevitably not transferred and remains on the photoreceptor drum 103*a* to generate untransferred toner that is further supplied downstream from the photoreceptor drum 103*a*. The destaticizer 121*a* is arranged downstream from the transfer section. The destaticizer 121*a* destaticizes the untransferred toner that is not transferred in the transfer section and remains on the photoreceptor drum 103*a*. The untransferred toner is destaticized together with the photoreceptor drum 103*a*. The brush roller 122*a* scatters the untransferred toner on the surface of the photoreceptor drum 103*a*. (This process is performed so that the succeeding processes can be performed appropriately.) Thereafter, the charger 105*a* charges the untransferred toner to the negative polarity (e.g., −600 V) equivalent to the surface of the photoreceptor drum 103*a*. The above-mentioned phenomenon, collection of the untransferred toner, and the image transfer are then repeated.

The succeeding image forming units 100*b*, 100*c*, and 100*d* perform the similar processes in synchronization with formation of a toner image in the image forming unit 100*a*. That is to say, the magenta, cyan, and black toner images are sequentially overlapped and transferred to the paper P transported by the transport belt 111 to form a color image. The paper P where the color image is formed is further transported to the fixing apparatus (not shown) for fixing the color image. A control section (not shown) automatically controls the above-mentioned operations.

EXAMPLE 1

The image forming apparatus 100 having the above-mentioned configuration is used to form an image as follows. As the first example, an experiment is carried out to compare the conventional image forming method with the image forming method according to the present invention to change the irradiation intensity of a laser in the exposure apparatus with respect to an exposure error. Table 1 shows a result of visually evaluating the hysteresis of output images after developing the yellow, magenta, cyan, and black colors according to the conventional method. In the experiment, the four colors of toners are sequentially supplied to only the image forming unit 100*d* in order to eliminate an effect of the reverse transfer toner. Accordingly, the evaluation is carried out so that an image of each color can be formed under the same environmental condition. (In Table 1, numeral “4” represents a case most difficult to determine the hysteresis; numeral “1”represents a case easiest to determine the hysteresis. The other tables to follow use the same method of evaluation indications using these numerals.)

TABLE 1

| Image pattern | Yellow | Magenta | Cyan | Black |
|---|---|---|---|---|
| Solid image | 4 | 4 | 4 | 4 |
| 50% halftone image | 4 | 4 to 3 | 2 | 1 |

In Table 1, the halftone is based on the area print ratio of 50% (printing one dot at 600 dpi). A chart (A4-size paper) as shown in FIG. 2 is used for the evaluation. The photoreceptor drum 103*d* of the image forming unit 100*d* has a diameter of 30 mm. For this reason, the image hysteresis caused by an exposure error appears as a density difference downstream (approximately 10 cm or later from the top end) in the transport direction of the paper P. In the experiment, a transfer bias for the photoreceptor drum in each image forming unit is adjusted so as to keep the amount of untransferred toner for each color constant (approximately 40 [g/cm$^2$]). As a light source, the semiconductor laser with the center wavelength of 680 nm is used and the light intensity for the exposure section is 400 W.

An exposure error due to untransferred toner causes the image hysteresis. As seen from Table 1, the image hysteresis is hardly recognizable on the solid image in each color, but is recognizable on the halftone image containing an area where the development field is inconstant. The degree of recognizability is ordered as black>cyan>magenta≧yellow. This order corresponds to the order of intensities with which pigments used for the respective toners absorb a laser beam as the light source. It can be understood that the toner absorbing more laser beam easily causes the image hysteresis. Then, we carried out an experiment similar to that mentioned above in the order of black, cyan, magenta, and yellow by increasing the irradiation intensity of the laser. Table 2 below shows a result of the experiment by setting irradiation intensities to 1000 [W], 800 [W], 600 [W], and 400 [W] corresponding to lasers for forming black, cyan, magenta, and yellow images. As seen from Table 2, it will be understood that the degree of the hysteresis is greatly improved in comparison with the conventional method of keeping almost the constant irradiation intensity of lasers for forming images in the respective colors.

TABLE 2

| Image pattern | Yellow | Magenta | Cyan | Black |
|---|---|---|---|---|
| Solid image | 4 | 4 | 4 | 4 |
| 50% halftone image | 4 | 4 | 4 to 3 | 4 to 3 |

When the 4-drum tandem image forming apparatus 100 in compliance with the photoreceptor cleanerless system is actually used for color printing, it is necessary to consider an effect of exposure error due to not only the untransferred toner, but also the reverse transfer toner. In order to minimize the image hysteresis due to the reverse transfer toner, it just needs to position the developing apparatus for the black or cyan toner downstream in the transport direction of the paper P since these toners easily cause an exposure error. With respect to the arrangement of the developing apparatuses, it is desirable to sequentially arrange the yellow, magenta, cyan, and black developing apparatuses or the magenta, yellow, cyan, and black developing apparatuses from upstream to downstream along the transport direction of the paper P. An exposure error due to the untransferred toner and the reverse transfer toner becomes remarkable in proportion to the sum of layer thicknesses for the untransferred toner and the reverse transfer toner. It is necessary to adjust the transfer condition so that the sum of layer thicknesses for the untransferred toner and the reverse transfer toner will be 100 [g/cm$^2$] or less, or more satisfactorily, 60 [g/cm$^2$] or less during transfer of a solid image. For very satisfactory image quality, it is desirable to reduce the sum of layer thicknesses to 30 [g/cm$^2$] or less.

EXAMPLE 2

As the second example, an experiment is carried out to compare the conventional image forming method with the image forming method according to the present invention to change the exposure resolution for a specific color. Table 3 shows a result that the untransferred black toner causes the image hysteresis depending on dots per inch. In this case, the method of collecting data follows that for Table 1. An exposure error due to untransferred toner causes the image hysteresis. As described in example 1, the image hysteresis is hardly recognizable on the solid image, but is recognizable on the halftone image containing an area where the development field is inconstant. It will be understood that the image hysteresis can be made inconspicuous by decreasing the exposure resolution for forming an electrostatic latent image compared to the other colors of toners especially with respect to an image forming portion greatly causing an exposure error such as the black toner.

TABLE 3

| Image pattern | 150 dpi | 300 dpi | 600 dpi |
|---|---|---|---|
| 50% halftone | 4 to 3 | 3 to 2 | 1 |

When the 4-drum tandem image forming apparatus 100 in compliance with the photoreceptor cleanerless system is used for color printing, Table 4 shows a result of visually evaluating the image hysteresis by decreasing the exposure resolution of the black image forming unit and a result of visually evaluating the image hysteresis by decreasing the exposure resolutions of the black and yellow image forming units in comparison with the conventional method. In this case, evaluation indicates that the image hysteresis is slightly conspicuous; evaluation o indicates that the image hysteresis is inconspicuous and the image is satisfactory. A laser beam having a diameter of 90 m is configured to be irradiated to the photoreceptor drum for the black image forming unit. In addition, a laser beam having a diameter of 70 m is configured to be irradiated to the photoreceptor drums for the image forming units in the other colors.

TABLE 4

| Image pattern | Yellow | Magenta | Cyan | Black | Image hysteresis |
|---|---|---|---|---|---|
| Conventional method | 600 dpi | 600 dpi | 600 dpi | 600 dpi | |
| Example 2-1 | 600 dpi | 600 dpi | 600 dpi | 300 dpi | o |
| Example 2-2 | 300 dpi | 600 dpi | 600 dpi | 300 dpi | o |

EXAMPLE 3

The following describes another example using an image forming apparatus 200 in FIG. 3 configured on the basis of the 4-rotation image forming system employing the photoreceptor cleanerless system. The configuration of the image forming apparatus 200 in FIG. 3 will be described first. The image forming apparatus 200 in FIG. 3 comprises a photoreceptor belt 202; rollers 202*a*, 202*b*, 202*c*, 202*d*, and 202*e* to hold and drive the photoreceptor belt 202; a charger 205; an exposure apparatus 204; four developing apparatuses 200*a*, 200*b*, 200*c*, and 200*d*; an intermediate transferrer 203; a paper cassette 218 with a sheet feed roller 207; a paper transport apparatus 219; an aligning roller 210; a transfer roller 211; a paper release apparatus 212; a fixing apparatus 213; and a intermediate transferrer cleaner 215.

In the image forming apparatus 200 of FIG. 3, the photoreceptor belt 202 is in close contact with the surface of the intermediate transferrer 203 by means of the rollers 202*a* and 202*b* on one side. On the other side, the photoreceptor belt 202 is held by the rollers 202*c*, 202*d*, and 202*e* so as to freely rotate in the direction of arrow Q by keeping an appropriate interval and tension between the photoreceptor belt 202 and the developing apparatuses 200*a*, 200*b*, 200*c*, and 200*d*. A motor (not shown) is provided to any of the rollers 202*a*, 202*b*, 202*c*, 202*d*, and 202*e* to rotate the photoreceptor belt 202. The charger 205 evenly charges the surface of the photoreceptor belt 202 that is rotated in this manner.

On the evenly charged photoreceptor belt 202 as mentioned above, the exposure apparatus 204 first performs exposure corresponding to a yellow image to form a yellow electrostatic latent image. When the yellow electrostatic latent image reaches the developing apparatus 200*a*, the developing apparatus 200*a* develops the electrostatic latent image using the yellow toner based on this image. A yellow toner image is formed on part of the photoreceptor belt 202 and this part closely contacts with the intermediate transferrer 203 in accordance with the rotation of the photoreceptor belt 202. Then, the yellow toner image is transferred to the intermediate transferrer 203. After this transfer process, that part of the photoreceptor belt 202 leaves the intermediate transferrer 203, is destaticized by a destaticizer (not shown) by means of optical destaticization, for example, and moves to the charger 205.

As mentioned above, the photoreceptor belt 202 moves to the charger 205 and then is recharged. During the transfer process, some of the toner (untransferred toner) is not transferred to the intermediate transferrer 203 and remains on the photo receptor belt 202. In this case, the untransferred toner is charged together with the photoreceptor belt 202. On the evenly charged photoreceptor belt 202 as mentioned above, the exposure apparatus 204 first performs exposure corresponding to a magenta image to form a magenta electrostatic latent image. When the magenta electrostatic latent image reaches the developing apparatus 200*b*, the developing apparatus 200*b* cleans the untransferred toner and develops the electrostatic latent image using the magenta toner based on the electrostatic latent image. The magenta toner image formed on the photoreceptor belt 202 is transferred so as to overlap with the yellow toner image already formed on the intermediate transferrer 203.

The same process is performed for cyan and black images. The four colors of toners are overlapped on the intermediate transferrer 203 to form a color image. Upon completion of the color image formation, the sheet feed roller 207 takes a sheet of paper P out of the paper cassette 218. The paper transport apparatus 219 transports the paper P to the intermediate transferrer 203. The aligning roller 210 once stops the paper P transported by the paper transport apparatus 219 to correctly align the paper P. The paper P is adjusted so that its top end corresponds to that of the toner image on the intermediate transferrer 203. After adjusted by the aligning roller 210, the paper P is further forwarded between the intermediate transferrer 203 and the transfer roller 211 opposite the intermediate transferrer 203. The 4-color toner image formed on the intermediate transferrer 203 is transferred to the paper P at a time (secondary transfer).

Containing the 4-color transferred toner image, the paper P is released from the intermediate transferrer 203 in response to an action of the paper release apparatus 212 that supplies an AC charge for paper release. The paper P is forwarded to the fixing apparatus 213 to fix the toner image. After the above-mentioned secondary transfer, the surface of the intermediate transferrer 203 contains toner not transferred to the paper P. For this reason, the intermediate transferrer cleaner 215 is provided. After the secondary transfer, the intermediate transferrer cleaner 215 is made in contact with the intermediate transferrer 203 to remove the untransferred toner for cleaning. While the 4-color toner image is formed on the intermediate transferrer 203, the intermediate transferrer cleaner 215 is set to be away from the intermediate transferrer 203.

The following image formation is carried out as the third example using the image forming apparatus 200 that is configured as mentioned above. When a red or near-infrared laser is used as the exposure source as shown in Table 1, an exposure error due to the untransferred toner occurs in the order of black>cyan>magenta≧yellow with respect to the toner colors. As is known in fluid phenomena, the toner with a small particle diameter generally does not cause an exposure error. Therefore, the image forming unit for the black toner especially causes a remarkable exposure error which can be improved by using a smaller particle diameter than that for the other toners. The example specified the volume-based average particle diameters: 5.5 m for the black toner, 6.0 m for the cyan toner, 7.0 m for the magenta toner, and 8.5 m for the yellow toner. As a result, a satisfactory halftone image was created to indicate a little image hysteresis.

The above-mentioned example specified the weight-based average charged amount for the toner in each color almost equally to 30±5 [C/g]. The above-mentioned example was conditioned so that toners can be easily developed with respect to a specified development field in the order of particle diameter sizes (i.e., yellow, magenta, cyan, and black). In addition, the color toners were configured to be developed on the photoreceptor in the order of yellow, magenta, cyan, and black. These conditions made it possible to selectively exhaust reverse transfer toners out of the developing apparatus into which the reverse transfer toners mixed due to the reverse transfer phenomenon. A remarkable effect of such selective development could be confirmed when a 2-component developing apparatus was used.

In such case, a color mixture in the developing apparatus could be minimized compared to the conventional method.

The positive use of the above-mentioned selective development is especially effective for an image forming apparatus having a mode of exhausting toner in the developing apparatus when a certain degree of color mixture occurs. Alternatively, the positive use of the above-mentioned selective development is also effective for an image forming apparatus provided with a brush or an equivalent member for collecting or blending the reverse transfer toner and the untransferred toner before development. It is also necessary to consider the effect of exposure error due to the reverse transfer toner when performing color printing on the photoreceptor cleanerless 4-rotation image forming apparatus. In order to minimize the image hysteresis due to the reverse transfer toner, it is desirable to later develop the black or cyan toner that causes a large exposure error. From the comprehensive viewpoint, the above-mentioned example performed the development in the order of yellow, magenta, cyan, and black. In addition, it was confirmed that a serious problem does not occur if the development is performed in the order of magenta, yellow, cyan, and black. Further, when color printing is performed on the 4-drum tandem image forming apparatus, based on the same viewpoint as that mentioned above, it is possible to minimize a color mixture and an exposure error by configuring toner particle diameters in the descending order of yellow, magenta, cyan, and black.

EXAMPLE 4

The following image formation was carried out as the fourth example using the image forming apparatus 100 in FIG. 1. The image hysteresis is accompanied by an exposure error due to the untransferred toner or the reverse transfer toner. When a red or near-infrared laser is used as the exposure source as shown in Table 1 above, the image hysteresis is remarkable in the order of black>cyan>magenta≧yellow with respect to the toner colors. An important factor is the relationship between the pigment's absorption wavelength and the exposure wavelength. The cyan toner absorbs red light and easily causes an exposure error when a red laser is used. Accordingly, the example uses a blue laser. The yellow toner absorbs blue light and causes an exposure error more easily than the case of using the red laser. However, the image hysteresis of the yellow toner is hardly recognizable to human eyes.

The following method was carried out to confirm the above-mentioned premise. That is to say, results of the image hysteresis for the halftone image formation was compared by using a blue semiconductor laser with the 410 nm wavelength and a red laser with the 680 nm wavelength as exposure sources for the image forming apparatus 100. However, the blue laser and the red laser produce different carrier generation quantum yields even if the same photoreceptor is used. Accordingly, exposure intensities for these lasers are adjusted so that electric potentials remaining on the photoreceptor will indicate almost the same tendency. In order to minimize dependency of a latent image itself on the beam diameter or effects of lenses, an evaluation image was formed so that the halftone portion in FIG. 2 will have a slightly large image structure (2 by 2 pixels at 600 dpi). The use of the blue laser decreased exposure errors for the cyan toner as shown in Table 5. As a result, the image hysteresis in cyan and full-color toner images was decreased.

TABLE 5

| Light source | Yellow | Magenta | Cyan | Black |
|---|---|---|---|---|
| Near-infrared laser without exception (conventional example) | 4 | 4 to 3 | 3 to 2 | 3 to 2 |
| Blue laser without exception (example 4) | 4 | 4 to 3 | 4 to 2 | 3 to 2 |

EXAMPLE 5

As the fifth example, the image formation was carried out using the image forming apparatus 100 in FIG. 1 and using a blue semiconductor laser with the 410 nm wavelength and a red laser with the 680 nm wavelength as exposure sources in accordance with the arrangement method to be described. That is to say, the red laser with the 680 nm wavelength is used as the exposure source for image formation with the yellow toner. The blue laser with the 410 nm wavelength is used as the exposure source for image formation with the cyan toner. While the red laser or the blue laser may be used as the exposure source for image formation with the black and magenta toners, the red laser was used for this example. As a result, an image was formed with minimal exposure errors due to the untransferred toner or the reverse transfer toner and with the little image hysteresis.

EXAMPLE 6

In this example, the image forming apparatus is configured similarly to the image forming apparatus 100 in FIG. 1. The image forming units are arranged in the order of yellow, magenta, cyan, and black from upstream to downstream. The image forming units 100*a*, 100*b*, 100*c*, and 100*d* are configured to ensure the amounts of toners 400 [g/cm$^2$], 400 [g/cm$^2$], 600 [g/cm$^2$], and 650 [g/cm$^2$], respectively, developed to the photoreceptor drums (photoreceptors) 103*a*, 103*b*, 103*c*, and 103*d*. That is to say, the toner layer becomes thicker from upstream to downstream. When the image forming unit is photoreceptor cleanerless, the ratio of final color mixture in the developing apparatus is determined by Y/X, where X is the development amount of toner in the image forming unit and Y is the amount of toners in the other colors to be reversely transferred to the photoreceptor of that image forming unit. A 4-drum tandem apparatus such as the image forming apparatus 100 is more subject to an effect of the reverse transfer downstream than upstream along the direction of transfer material movement. As a result, the degree of color mixture increases accordingly. When the development amount is increased for a downstream developing apparatus like this example, it is possible to suppress the ratio of color mixture in the developing apparatus and improve the color reproducibility.

In the above-mentioned development condition, the transfer condition was adjusted as follows: the average reverse transfer toner amount of yellow toner in the magenta image forming unit to be 10 [g/cm$^2$]; the sum of the average reverse transfer toner amounts of yellow and magenta toners in the cyan image forming unit to be 20 [g/cm$^2$]; and the sum of the average reverse transfer toner amounts of yellow, magenta, and cyan toners in the black image forming unit to be 30 [g/cm$^2$]. Then, it is possible to computationally and experimentally confirm that the continuous color printing finally reaches such ratios of color mixture as: 10/400 in the magenta developing apparatus; 20/600 in the cyan developing apparatus; and 30/650 in the black developing apparatus. An allowable ratio of color mixture may depend on the combination of toners but is desirably conditioned to the range between 1/10 and 1/20 or lower. The above-mentioned method can be applied to 4-rotation image forming apparatuses that do not comply with the 4-drum tandem system.

EXAMPLE 7

In this example, the image forming apparatus is configured similarly to the image forming apparatus 100 in FIG. 1. The image forming units are arranged in the order of yellow, magenta, cyan, and black from upstream to downstream. The image forming units 100*a*, 100*b*, 100*c*, and 100*d* are configured to initially contain the weight-based average charged amounts of toners −15 [C/g], −20 [C/g], −25 [C/g], and −30 [C/g], respectively. As a result, the toners are easily developed to a specific development field in the ascending order of charged amounts, i.e., yellow, magenta, cyan, and black. This makes it possible to selectively exhaust reverse transfer toners out of the developing apparatus into which the reverse transfer toners mixed due to the reverse transfer phenomenon.

Table 6 below exemplifies mixing percentages of the yellow toner in the cyan developing apparatus when 500 and 1000 sheets of images are output. The positive use of the above-mentioned selective development is especially effective for an image forming apparatus having a mode of exhausting toner in the developing apparatus when a certain degree of color mixture occurs. Alternatively, the positive use of the above-mentioned selective development is also effective for an image forming apparatus provided with a brush or an equivalent member for collecting or blending the reverse transfer toner and the untransferred toner before development. The effect of decreasing the color mixture using the selective development can be further improved by increasing the amount of each toner to be developed from upstream to downstream in the direction of transfer material movement or decreasing diameters of toner particles.

TABLE 6

| Charged amount of toner [C/g] . . . | 500 sheets | 1000 sheets |
|---|---|---|
| Yellow = Cyan = −25 . . . | 6% | 10% |
| Yellow = −15, Cyan = −25 . . . | 4% | 7% |

As mentioned above with reference to FIG. 3, there has been described the image forming apparatus that uses the photoreceptor belt to temporarily form a toner image and transfers the formed toner image to the paper (secondary transfer) via the photoreceptor drum as the intermediate transferrer. The above-mentioned contents of the invention can be likewise applied to the image forming apparatus as shown in FIG. 4 that is configured by replacing the transport belt of the image forming apparatus in FIG. 1 with an intermediate transfer belt. In an image forming apparatus 300 of FIG. 4, an intermediate transfer belt 112 is rotatively driven by rollers 128, 129, and 129*a*, and endlessly runs between photoreceptor drums 103*a*, 103*b*, 103*c*, and 103*d* and transfer rollers 123*a*, 123*b*, 123*c*, and 123*d*. A toner image is formed on the intermediate transfer belt 112 by the photoreceptor drums 103*a*, 103*b*, 103*c*, and 103*d* and the transfer rollers 123*a*, 123*b*, 123*c*, and 123*d*. The formed toner image is transferred to the paper P that is fed between the roller 129*a* and a secondary transfer roller 229 at a timing adjusted by an aligning roller 214. In this case, the secondary transfer roller 229 is supplied with a DC voltage for secondary transfer from a power supply 228.

Since the image forming apparatus according to the present invention is configured as mentioned above, it is possible, without largely changing the conventional configuration, to provide the photoreceptor cleanerless image forming apparatus that can reduce the reverse transfer toner and the untransferred toner, and decrease color mixture or an exposure error caused by the reverse transfer toner or the untransferred toner.

What is claimed is:

1. A photoreceptor cleanerless image forming apparatus to overlappingly form yellow, magenta, cyan, and black toner images, wherein said apparatus includes a control section that is configured to decrease color mixture or exposure error based on controlling an exposure intensity, wherein said apparatus comprises four photoreceptor cleanerless image forming units each including at least a photoreceptor, a charger, an exposure apparatus, and a developing apparatus for overlappingly forming yellow, magenta, cyan, and black images; and the control section configured to control:

exposure intensities Iy, Ic, Im, and Ik to satisfy conditions of $Ik \geqq Ic$, $Ik \geqq Im$, and $Ik > Iy$, where said exposure intensities ly, Ic, Im, and Ik correspond to exposure sources for respective exposure apparatuses in respective of said image forming units to form yellow, magenta, cyan, and black images, respectively, and exposure resolutions Ry, Rm, Rc, and Rk to satisfy conditions of $Rk \leqq Rc$, $Rk \leqq Rm$, and $Rk \leqq Ry$, where said exposure resolutions Ry, Rm, Rc, and Rk correspond to exposure apparatuses in image forming units to form yellow, magenta, cyan, and black images, respectively, and wherein volume-based average particle diameters Pa, Pb, Pc, and Pd satisfy conditions of $Pb \geqq Pd$, $Pc \geqq Pd$, and $Pa > Pd$, where Pa, Pb, Pc, and Pd indicate volume-based average particle diameters of toners to be developed on a photoreceptor in the order of development.

2. A photoreceptor cleanerless image forming apparatus to overlappingly form yellow, magenta, cyan, and black toner images, wherein said apparatus includes a control section that is configured to decrease color mixture or exposure error based on controlling an exposure intensity, wherein said apparatus is a 4-drum tandem image forming apparatus comprising four photoreceptor cleanerless image forming units each including at least a photoreceptor, a charger, an exposure apparatus, and a developing apparatus for overlappingly forming yellow, magenta, cyan, and black images; and the control section configured to control:

exposure intensities ly, Ic, Im, and Ik to satisfy conditions of $Ik \geqq Ic$, $Ik \geqq Im$, and $Ik > Iy$, where said exposure intensities Iy, Ic, Im, and Ik correspond to exposure sources for respective exposure apparatuses in respective of said image forming units to form yellow, magenta, cyan, and black images, respectively, and exposure resolutions Ry, Rm, Rc, and Rk to satisfy conditions of $Rk \leqq Rc$, $Rk \leqq Rm$, and $Rk \leqq Ry$, where said exposure resolutions Ry, Rm, Rc, and Rk correspond to exposure apparatuses in image forming units to form yellow, magenta, cyan, and black images, respectively, and wherein volume-based average particle diameters Pa, Pb, Pc, and Pd satisfy conditions of Pb≧Pd, Pc≧Pd, and Pa>Pd, where Pa, Pb, Pc, and Pd indicate volume-based average particle diameters of toners to be developed on a photoreceptor in the order of development.

3. The image forming apparatus according to claim 2, wherein said control section is configured to control each image forming unit to adjust a transfer condition such that the sum of mass per unit area for untransferred toner and reverse transfer toner becomes 100[g/cm$^2$] or less during transfer of a solid image.

4. The image forming apparatus according to claim 2, wherein said exposure source complies with a red or near-infrared area whose center wavelength is 630 nm or more.

5. The image forming apparatus according to claim 2, wherein said exposure source is a semiconductor laser.

6. The image forming apparatus according to claim 1, wherein said apparatus is a 4-drum tandem image forming apparatus; and exposure resolutions Ry, Rm, Rc, and Rk are configured to satisfy conditions of Rc≦Rm and Rm>Rk.

7. The image forming apparatus according to claim 6, wherein said image forming unit is provided with a transfer condition such that the sum of mass per unit area for untransferred toner and reverse transfer toner becomes 100[g/cm$^2$] or less during transfer of a solid image.

8. The image forming apparatus according to claim 6, wherein said exposure source complies with a red or near-infrared area whose center wavelength is 630 nm or more.

9. The image forming apparatus according to claim 6, wherein said exposure source is a semiconductor laser.

10. The image forming apparatus according to claim 6, wherein beam diameters Dy, Dm, Dc, and Dk are configured to satisfy conditions of Dk≧Dc≧Dm≧Dy and Dk>Dy, where said beam diameters Dy, Dm, Dc, and Dk are used for said exposure source to create an electrostatic latent image.

11. The image forming apparatus according to claim 6, wherein said exposure resolution Ry equals said exposure resolution Rk.

12. The image forming apparatus according to claim 1, wherein said apparatus is a 4-drum tandem image forming apparatus; and exposure resolutions Ry, Rm, Rc, and Rk are configured to satisfy conditions of Rc≦Rm≦Ry and Ry>Rk.

13. The image forming apparatus according to claim 1, wherein volume-based average particle diameters Pa, Pb, Pc, and Pd are configured to satisfy conditions of Pa≧Pb≧Pc.

14. The image forming apparatus according to claim 13, wherein said image forming apparatus is configured in 4-drum tandem.

15. The image forming apparatus according to claim 13, wherein said image forming apparatus is configured in accordance with a 4-rotation system so that four photoreceptor cleanerless developing apparatuses can overlappingly form yellow, magenta, cyan, and black images on an intermediate transferrer, and then these images are transferred onto a transfer material from said intermediate transferrer at a time.

16. The image forming apparatus according to claim 13, wherein a transfer condition is such that the sum of mass per unit area for untransferred toner and reverse transfer toner becomes 100[g/cm$^2$] or less during transfer of a solid image.

17. The image forming apparatus according to claim 13, wherein said exposure source performs exposure within a red or near-infrared area whose center wavelength is 630 nm or more.

18. The image forming apparatus according to claim 13, wherein said exposure source is a semiconductor laser.

19. The image forming apparatus according to claim 13, wherein the weight-based average charged amounts of yellow, magenta, cyan, and black toners are configured to produce an initial difference within the range of ±5 [C/g].

20. The image forming apparatus according to claim 1, wherein an exposure source used for forming an electrostatic latent image complies with a blue or blue-violet area whose center wavelength is 460 nm or less.

21. The image forming apparatus according to claim 20, wherein said image forming apparatus is provided with a transfer condition such that the sum of mass per unit area for untransferred toner and reverse transfer toner becomes 100[g/cm$^2$] or less during transfer of a solid image.

22. The image forming apparatus according to claim 20, wherein said image forming apparatus is configured in 4-drum tandem so that the four photoreceptor cleanerless image forming units can overlappingly form yellow, magenta, cyan, and black images on a transfer material.

23. The image forming apparatus according to claim 20, wherein said image forming apparatus is configured in accordance with a 4-rotation system so that the four photoreceptor cleanerless image forming units can overlappingly form yellow, magenta, cyan, and black images on an intermediate transferrer, and then these images are transferred onto a transfer material from said intermediate transferrer at a time.

24. The image forming apparatus according to claim 1, wherein said apparatus is a 4-drum tandem image forming apparatus; and further comprising an exposure source for forming a yellow electrostatic latent image which complies with a red or near-infrared area whose center wavelength is 630 nm or more, and an exposure source used for forming at least a cyan electrostatic latent image out of the other electrostatic latent images in the remaining colors which complies with a blue or blue-violet area whose center wavelength is 460 nm or less.

25. The image forming apparatus according to claim 24, wherein said exposure source is a semiconductor laser.

26. The image forming apparatus according to claim 24, wherein said image forming unit is provided with a transfer condition such that the sum of mass per unit area for untransferred toner and reverse transfer toner becomes 100[g/cm$^2$] or less during transfer of a solid image.

27. The image forming apparatus according to claim 24, wherein exposure sources for forming magenta and black electrostatic latent images comply with a red or near-infrared area whose center wavelength is 630 nm or more.

28. The image forming apparatus according to claim 24, wherein exposure sources for forming magenta and black electrostatic latent images comply with a blue or blue-violet area whose center wavelength is 460 nm or less.

29. The image forming apparatus according to claim 1, wherein layer thicknesses Ta, Tb, Tc, and Td are configured to satisfy conditions of Ta≦Tb≦Tc≦Td and Ta<Td, where Ta, Tb, Tc, and Td indicate thieknesses of toner layers to be transferred to a transfer material in this order.

30. The image fonning apparatus according to claim 29, wherein a ratio between X and Y is greater than or equal to 1/25000 and is smaller than or equal to 1/10, where X indicates a layer thickness of a toner image developed on a photoreceptor during solid image formation, and Y indicates a layer thickness of toner returned to a photoreceptor from a solid toner image already transferred to a transfer material.

31. The image forming apparatus according to claim 29, wherein said image forming apparatus is configured in 4-drum tandem so that four photoreceptor cleanerless image forming units can overlappingly form yellow, magenta, cyan, and black images on a transfer material.

32. The image forming apparatus according to claim 29, wherein said four toner images are formed in the order of yellow, magenta, cyan, and black from upstream to downstream.

33. The image forming apparatus according to claim 29, wherein said image forming apparatus is configured in accordance with a 4-rotation system so that the four photoreceptor cleanerless image forming units can overlappingly form yellow, magenta, cyan, and black images on an intermediate transferrer, and then these images are transferred onto a transfer material from said intermediate transferrer at a time.

34. The image forming apparatus according to claim 1, wherein weight-based average charged amounts Qa, Qb, Qc, and Qd are configured to satisfy conditions of Qa≦Qb≦Qc≦Qd and Qa<Qd, where Qa, Qb, Qc, and Qd indicate weight-based average charged amounts of toners to be transferred to a transfer material in this order.

35. The image forming apparatus according to claim 34, wherein volume-based average particle diameters of yellow, magenta, cyan, and black toners are configured to produce an initial difference within the range of ±1 [m].

36. The image forming apparatus according to claim 34, wherein volume-based average particle diameters Pa, Pb, Pc, and Pd are configured to satisfy conditions of Pa≧Pb≧Pc.

37. The image forming apparatus according to claim 34, wherein layer thicknesses Ta, Tb, Tc, and Td are configured to satisfy conditions of Ta≦Tb≦Tc≦Td and Ta<Td, where Ta, Tb, Tc, and Td indicate layer thicknesses of toners to be developed on a photoreceptor in this order.

38. A photoreceptor cleanerless image forming apparatus to overlappingly form yellow, magenta, cyan, and black toner images, comprising:

a control means for decreasing color mixture or exposure error based on controlling an exposure intensity, wherein said apparatus is a 4-drum tandem image forming apparatus comprising four photoreceptor cleanerless image forming units each including at least a photoreceptor, a charger, an exposure apparatus, and a developing apparatus for overlappingly forming yellow, magenta, cyan, and black images; and the control means for controlling:

exposure intensities Iy, Ic, Im, and Ik to satisfy conditions of Ik≧Ic, Ik≧Im, and Ik>Iy, where said exposure intensities Iy, Ic, Im, and Ik correspond to exposure sources for respective exposure apparatuses in respective of said image forming units to form yellow, magenta, cyan, and black images, respectively, and exposure resolutions Ry, Rm, Rc, and Rk to satisfy conditions of Rk≦Rc, Rk ≦Rm, and Rk≦Ry, where said exposure resolutions Ry, Rm, Rc, and Rk correspond to exposure apparatuses in image forming units to form yellow, magenta, cyan, and black images, respectively, and wherein volume-based average particle diameters Pa, Pb, Pc, and Pd satisfy conditions of Pb≧Pd, Pc≧Pd, and Pa>Pd, where Pa, Pb, Pc, and Pd indicate volume-based average particle diameters of toners to be developed on a photoreceptor in the order of development.

39. A photoreceptor cleanerless image forming apparatus to overlappingly form yellow, magenta, cyan, and black toner images, comprising:

four photoreceptor cleanerless image forming units each including at least a photoreceptor, a charger, an exposure apparatus, and a developing apparatus for overlappingly forming yellow, magenta, cyan, and black images; and a control means for decreasing color mixture or exposure error based on controlling an exposure intensity, the control means for controlling:

exposure intensities Iy, Ic, Im, and Ik to satisfy conditions of Ik≧Ic, Ik≧Im and Ik>Iy, where said exposure intensities Iy, Ic, Im, and Ik correspond to exposure sources for respective exposure apparatuses in respective of said image forming units to form yellow, magenta, cyan, and black images, respectively, and exposure resolutions Ry, Rm, Rc, and Rk to satisfy conditions of Rk≦Rc, Rk ≦Rm, and Rk≦Ry, where said exposure resolutions Ry, Rm, Rc, and Rk correspond to exposure apparatuses in image forming units to form yellow, magenta, cyan, and black images, respectively, and wherein volume-based average particle diameters Pa, Pb, Pc, and Pd satisfy conditions of Pb≧Pd, Pc≧Pd, and Pa>Pd, where Pa, Pb, Pc, and Pd indicate volume-based average particle diameters of toners to be developed on a photoreceptor in the order of development.

40. A photoreceptor cleanerless image forming apparatus to overlappingly form yellow, magenta, cyan, and black toner images, comprising:

four photoreceptor cleanerless image forming units, each unit comprising:

a photoreceptor;

a charger;

an exposure apparatus comprising a semiconductor laser with a red or near-infrared area whose center wavelength is 630 nm or more; and a developing apparatus for overlappingly forming yellow, magenta, cyan, and black images; and a control section configured to decrease color mixture or exposure error based on controlling an exposure intensity, the control section configured to control:

exposure intensities Iy, Ic, Im, and Ik to satisfy conditions of Ik≧Ic, Ik≧Im, and Ik>Iy, where said exposure intensities Iy, Ic, Im, and Ik correspond to exposure sources for respective exposure apparatuses in respective of said image forming units to form yellow, magenta, cyan, and black images, respectively, and exposure resolutions Ry, Rm, Rc, and Rk to satisfy conditions of $Rk \leqq Rc$, $Rk \leqq Rm$, and $Rk \leqq Ry$, where said exposure resolutions Ry, Rm, Rc, and Rk correspond to exposure apparatuses in image forming units to form yellow, magenta, cyan, and black images, respectively, and wherein volume-based average particle diameters Pa, Pb, Pc, and Pd satisfy conditions of $Pb \geqq Pd$, $Pc \geqq Pd$, and $Pa > Pd$, where Pa, Pb, Pc, and Pd indicate volume-based average particle diameters of toners to be developed on a photoreceptor in the order of development, the control section configured to control each image forming unit to adjust a transfer condition such that the sum of mass per unit area for untransferred toner and reverse transfer toner becomes 100[g/cm$^2$] or less during transfer of a solid image.

* * * * *